US008961797B2

(12) United States Patent
Vaughan

(10) Patent No.: US 8,961,797 B2
(45) Date of Patent: Feb. 24, 2015

(54) WATER TREATMENT SYSTEM TANK SELECTOR VALVE ASSEMBLY

(71) Applicant: Clack Corporation, Windsor, WI (US)

(72) Inventor: Don Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 103 days.

(21) Appl. No.: 13/804,920

(22) Filed: Mar. 14, 2013

(65) Prior Publication Data
US 2014/0261697 A1  Sep. 18, 2014

(51) Int. Cl.
B01D 41/02 (2006.01)
C02F 1/00 (2006.01)
C02F 5/00 (2006.01)

(52) U.S. Cl.
CPC .. *C02F 1/006* (2013.01); *C02F 5/00* (2013.01)
USPC ........... 210/670; 210/677; 210/678; 210/687; 210/138; 210/205; 210/278

(58) Field of Classification Search
USPC .......... 210/670, 677, 678, 687, 138, 205, 278
See application file for complete search history.

(56) References Cited

U.S. PATENT DOCUMENTS

| 2,851,648 | A | * | 9/1958 | Reger | 318/267 |
|---|---|---|---|---|---|
| 3,007,494 | A | * | 11/1961 | Herzl | 137/625.65 |
| 3,023,605 | A | * | 3/1962 | Burk | 73/23.42 |
| 3,891,522 | A | | 6/1975 | McKay et al. | |
| 3,962,089 | A | * | 6/1976 | Fulukawa | 210/191 |
| 4,113,063 | A | * | 9/1978 | Troy | 185/40 R |
| 4,298,025 | A | | 11/1981 | Prior et al. | |
| 4,325,127 | A | * | 4/1982 | Major | 700/282 |
| 4,539,106 | A | | 9/1985 | Schwartz | |
| 5,022,994 | A | | 6/1991 | Avery et al. | |
| 5,361,588 | A | * | 11/1994 | Asami et al. | 62/6 |
| 5,628,899 | A | | 5/1997 | Vaughan | |
| 6,214,214 | B1 | | 4/2001 | Hansen et al. | |
| 6,402,944 | B1 | | 6/2002 | Vaughan | |
| 7,608,183 | B2 | | 10/2009 | Lilliback | |
| 2012/0285543 | A1 | * | 11/2012 | Michaels | 137/1 |

OTHER PUBLICATIONS

Clack WS1EE Twin Alternative Control Valve Pamphlet, Form No. 2983, Nov. 16, 2012.
Kinetico Concept Pamphlet, Oct. 10, 2002.

* cited by examiner

Primary Examiner — Chester Barry
(74) Attorney, Agent, or Firm — Boyle Fredrickson, S.C.

(57) ABSTRACT

A valve assembly for a twin tank-type water treatment system includes and a tank selector valve assembly that includes first and second rotary selector valves driven in concert with another by a reversible electric motor. The motor drives the first and second selector valves between (a) a first position in which an untreated water inlet and a treated water outlet of the valve assembly are coupled to a first resin tank, and a second resin tank is connected to a regeneration valve, and (b) a second position which the untreated water inlet and the treated water outlet of the valve assembly are coupled to the second resin tank, and the first resin tank is connected to a regeneration valve. The rotary valves may be disks that rotate relatively rapidly on a common shaft driven by the electric motor through an arc of 180° or less.

18 Claims, 15 Drawing Sheets

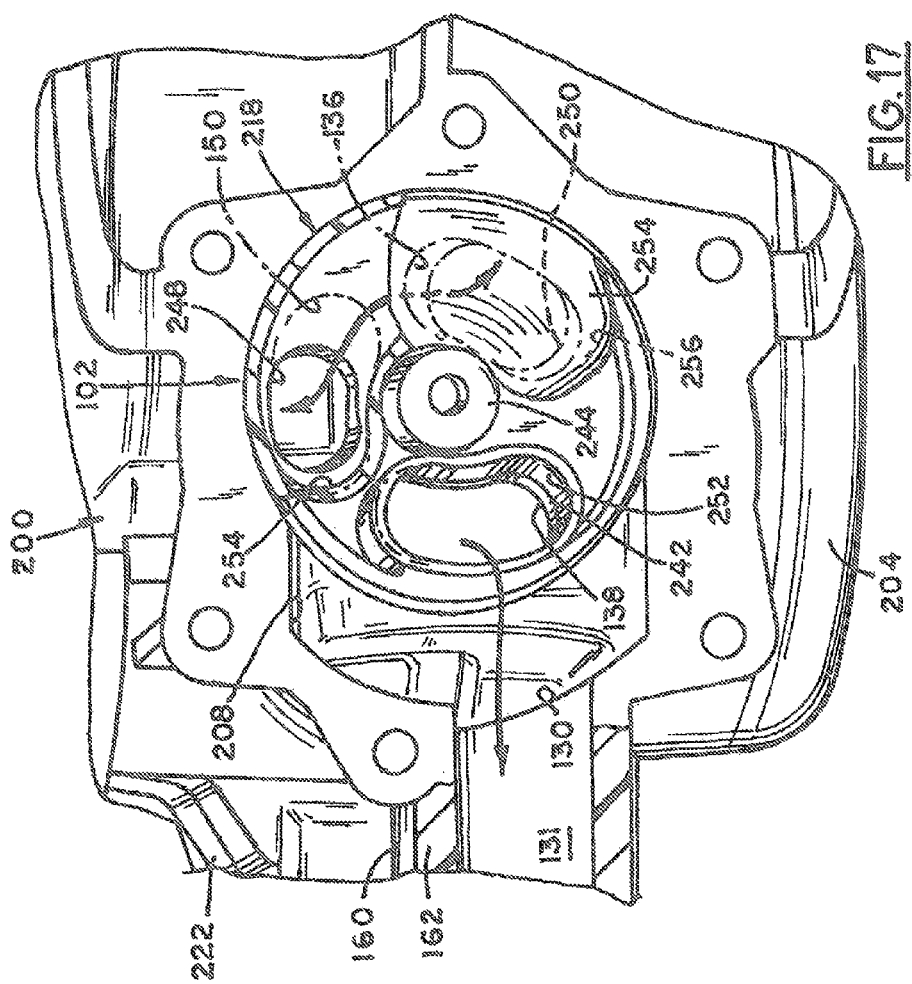

WATER TREATMENT SYSTEM TANK SELECTOR VALVE ASSEMBLY

BACKGROUND OF THE INVENTION

1. Field of the Invention

The invention relates to water treatment system control valves and, more particularly, relates to a water treatment system control valve assembly including a selector valve assembly that selectively places one of two tanks online while placing the other tank offline. The invention additionally relates to a water treatment system employing such a valve assembly and to a method of operating such a system.

2. Discussion of the Related Art

Water treatment systems (often called "water softeners") are widely used for removing calcium and other deposit causing materials from so-called "hard water." The typical water softener relies on an ion exchange process taking place in an ion-exchange resin bed stored in a resin tank of the water softener. As the water to be processed passes through the resin-filled tank, ions of calcium and other minerals in the water are exchanged with ions found in the resin, e.g., sodium, thereby removing objectionable ions from the water and exchanging them for less objectionable ions from the resin.

The capacity of the resin to exchange ions is finite and is reduced during the ion exchange process. If measures are not taken to regenerate the resin by replacing the undesirable ions with desirable ions, the ion exchange capacity of the resin will become exhausted. Water softeners typically are configured to periodically regenerate the ion exchange resin stored in the resin tank. Regeneration typically involves chemically replacing the objectionable ions such as calcium ions from the resin with less objectionable ions such as sodium ions. This replacement is typically performed by introducing a regenerant solution of sodium chloride or potassium chloride into the resin bed from a brine tank and thereafter flushing the regenerant solution from the bed. Regeneration of a water softener resin bed is sometimes accomplished in a direction that is co-current with the flow of water to be treated (often referred to as "downflow regeneration") and is sometimes accomplished in a direction that is countercurrent to the flow of water being treated (often referred to as "upflow regeneration"). The resin bed is typically backwashed with treated or untreated water in order to remove trapped particulate matter, and the resin tank can be rinsed with treated or untreated water to remove objectionable soluble materials. In order to prevent interruption of service, most water softeners are configured to allow bypass flow of untreated water directly to the service lines during backwash, rinse, and regeneration. All of these operations are known in the art.

The regeneration cycle typically is controlled by a control valve or "regeneration valve" mounted on top of the resin tank. The regeneration is coupled to a source of untreated water, a treated water or service outlet line, the brine tank, a drain connection, and the resin tank. The typical regeneration valve is actuated by an electric motor under the control of a timer and/or a usage indicator to cycle the water softener from service, brine introduction, backwash, fast rinse, and back to service.

Several different types of regeneration valves have been used in water treatment systems. Some are of the rotary disc type, in which the motor rotates a three-dimensional valve element to selectively connect and cover various inlet and outlet ports in the valve body bore in which the disc is mounted. A regeneration valve of this type is manufactured by EcoWater of Woodbury, Minn. Another control valve type, manufactured by Osmonics, comprises modified poppet valves. These multiple valve elements are independently actuated by cams. Still others are of the so-called reciprocating piston type, in which the motor drives a piston to reciprocate axially in a bore to selectively connect and cover various inlet and outlet ports in the bore. One such valve is disclosed in U.S. Pat. No. 6,402,944, the subject matter of which is incorporated herein by reference.

Water treatment systems traditionally employed a single resin tank. These systems suffered the disadvantage of supplying untreated water during the system's regeneration cycle. In order to avoid this drawback, so-called "twin tank" water treatment systems have been proposed that include two tanks, each of which includes a resin bed. While one tank is online supplying treated water, the other tank is offline and is either undergoing a regeneration cycle or in a stand-by mode.

Twin tank type water treatment systems typically employ a selector valve assembly to select which of the two tanks is online and which is offline. The selector valve assemblies on the market today are of complex construction, are slow acting, and/or are relatively complex and expensive to manufacture, install, and maintain. One such valve assembly is available from Pentair, Inc. and is generally described in U.S. Pat. No. 5,628,899. The Pentair selector valve assembly includes a multi-ported, relatively slow-acting rotor that must rotate 180° over a period of time that typically is on the order of several minutes. During this switchover period, treated water may be unavailable or may be mixed with untreated water due to the short circuit of fluid flow between the various ports of the valve. In addition, and as is the case with all other commercially available selector valve assemblies, the Pentair selector valve assembly is of a complex construction that is relatively expensive to manufacture and difficult to install and maintain.

The need therefore has arisen to provide a selector valve assembly for a twin tank type water treatment system that is simpler and less expensive to manufacture, install, and maintain than prior twin tank selector control valve assemblies.

There is also a need to provide a selector valve assembly for a twin tank type water treatment system that is faster-acting than prior art valves assemblies.

SUMMARY OF THE INVENTION

In accordance with a first aspect of the invention one or more of these needs are met by providing a valve assembly for a water treatment system that includes an untreated water inlet, a treated water outlet, a first outlet port coupled to an inlet of a first resin tank, a second outlet port coupled to an inlet of a second resin tank, a first inlet port coupled to an outlet of the first resin tank, a second inlet port coupled to an outlet of the second resin tank, a regeneration control valve connected to a brine tank and to a drain, and a tank selector valve assembly. The tank selector valve assembly includes first and second rotary selector valves and a reversible electric motor. The motor drives the first and second selector valves in concert between (a) a first position in which the first outlet port is coupled to the untreated water inlet, the first inlet port is coupled to the treated water outlet, and the inlet and outlet of the second resin tank are connected to the regeneration valve, and (b) a second position which the second outlet port is coupled to the untreated water inlet, the second inlet port is coupled to the treated water outlet, and the inlet and outlet of the first resin tank are connected to the regeneration valve. The rotary valves may, for example, be disks that rotate on a common shaft driven by the electric motor.

The selector valve assembly preferably takes the form of a pair of rotary disks mounted in easily-assessable chambers in a valve body. In this case, the first selector valve may be an inlet valve taking the form of a rotary disk located in an inlet chamber of a valve body, the inlet chamber having first, second, third, and fourth ports coupled to the untreated water inlet, the first outlet port, the second outlet port, and the regeneration valve, respectively. The disk has a first, through-bore that fluidically connects the port with which it communicates to the untreated water inlet of the valve assembly. The disk additionally has second and third bores that open into an inner axial face of the disk and that are coupled to one another by a channel at the outer face of the disk so as to fluidically connect the associated ports in the inlet chamber to one another while isolating those ports from the other two ports in the inlet chamber. When the disk is in the first position thereof, 1) the through bore in the disk is coupled to the first and second ports in the inlet chamber to fluidically connect the untreated water inlet to the inlet of the first tank and 2) the second and third ports in the disk are coupled to the third and fourth ports in the inlet chamber, respectively, thus coupling the inlet port of the second tank to the regeneration valve. Conversely, when the inlet disk is in the second position thereof, 1) the through bore is coupled to first and third ports in the inlet chamber to couple the third port (leading to the inlet of the second tank) to the untreated water inlet and 2) the second and third ports in the disk are coupled to the second and fourth ports in the inlet chamber, respectively, thus coupling the inlet of the first tank to the regeneration valve.

In an especially preferred arrangement, the second selector valve comprises a second, outlet valve disposed in an outlet chamber positioned in a side of the valve housing opposite the first side. The outlet valve preferably is identical to the inlet valve.

The invention additionally relates to a twin-tank type water treatment system having a valve assembly exhibiting one or more of the characteristics discussed above.

The invention additionally relates to a method of selecting between tanks of twin tank type water treatment system. The method includes, using a reversible electric motor, placing a second tank of the system online by rotating first and second selector valves of a valve assembly clockwise (1) from a first position in which a) untreated water flows into the valve assembly, through the first rotary selector valve, and into the first tank and b) treated water flows from the first tank, through the second rotary selector valve, and out of the valve assembly, (2) to a second position in which a) untreated water flows into the valve assembly, through the first rotary selector valve, and into the second tank and b) treated water flows from the second tank, through the second rotary selector valve, and out of the valve assembly. The method additionally comprises, using the reversible electric motor, placing the second tank offline and placing the first tank online by rotating the first and second selector valves counterclockwise from the second position to the first position. In each position, the inlet and outlet of the tank that is offline are coupled to a regeneration valve.

Moving the first and second rotary selector valves between the first and second positions thereof preferably requires the valves to rotate through no more than 180°, and preferably no more than 150°, and requires less than one minute, and preferably less than 30 seconds, to complete.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation.

BRIEF DESCRIPTION OF THE DRAWINGS

A preferred exemplary embodiment of the invention is illustrated in the accompanying drawings in which like reference numerals represent like parts throughout, and in which:

FIG. 17 corresponds to FIG. 16 but shows the outlet valve in a second position thereof.

DETAILED DESCRIPTION OF THE PREFERRED EMBODIMENT

Figure 1:
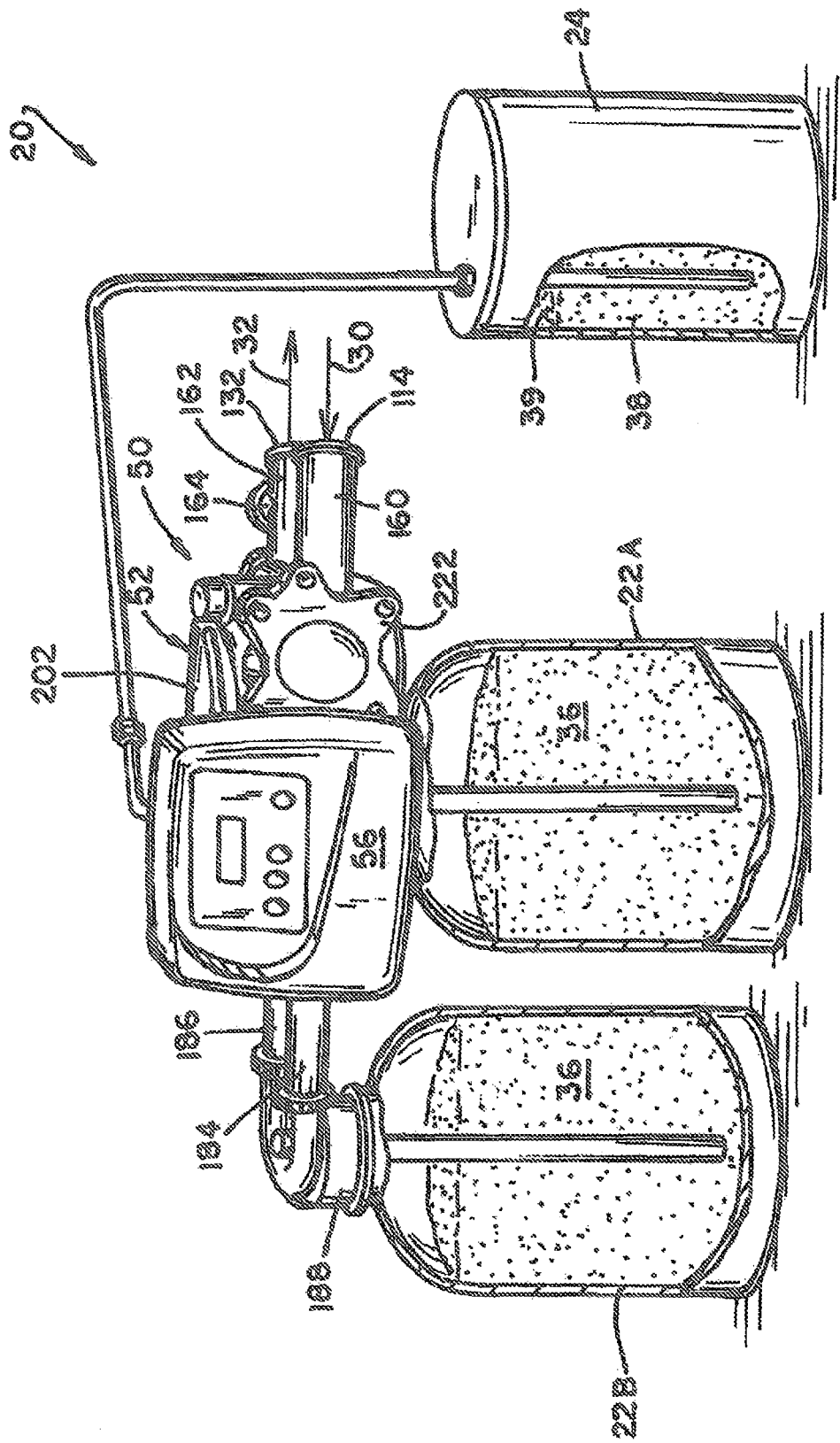
FIG. 1 is a somewhat schematic sectional side elevation view of a twin-tank type water treatment system incorporating a valve assembly constructed in accordance with a preferred embodiment of the invention.
Figure 2:
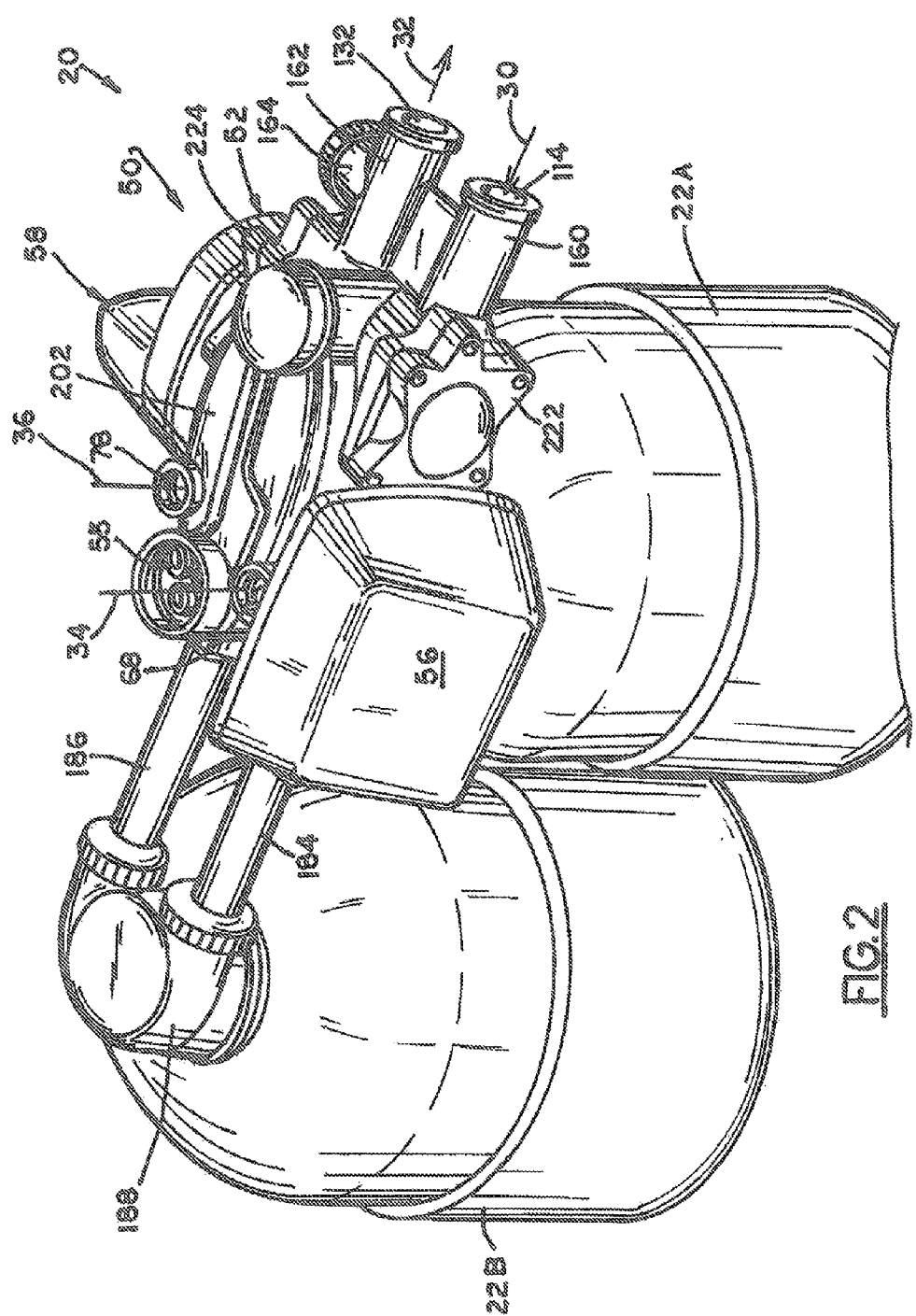
FIG. 2 is a perspective of the valve assembly and the resin tanks of the water treatment system of FIG. 1.
Figure 3:
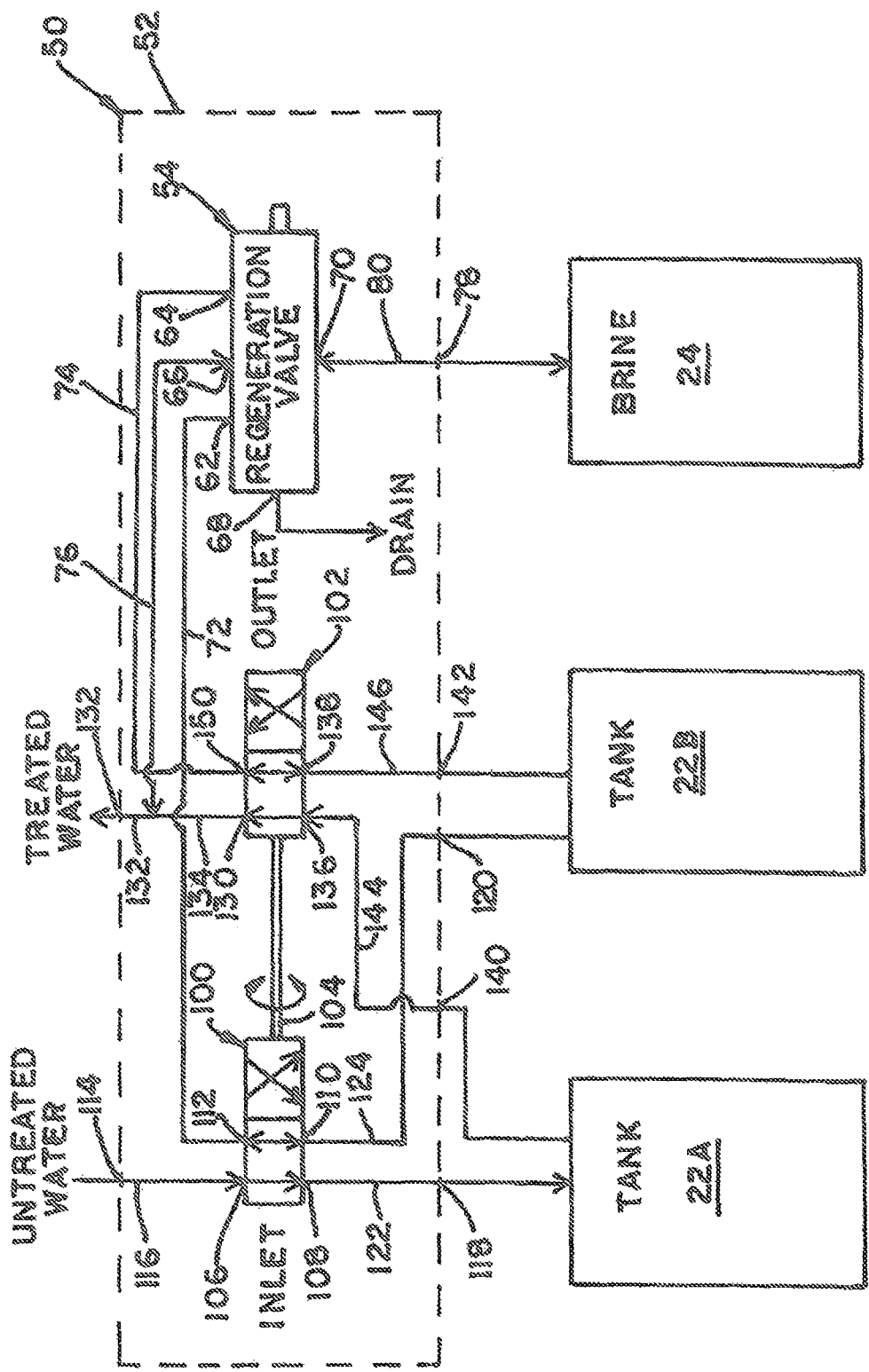
FIG. 3 is a schematic representation of the water treatment system of FIG. 1.

Referring to the drawings and initially to FIGS. 1-3, a water treatment system 20 is illustrated that employs a control valve assembly 50 constructed in accordance with a preferred embodiment of the invention. The water treatment system 20 is a so-called "twin tank" system having first and second resin tanks 22A and 22B and a brine tank 24. The control valve assembly 50 is fluidically coupled to the resin tanks 22A, 22B, the brine tank 24, an inlet line 30 leading to a source of untreated water, a treated water outlet line 32, and a drain line 34. The resin tanks 22A and 22B are filled with a treatment medium such as an ion exchange resin bed 36, and the brine tank 24 contains particles 38 of sodium chloride, potassium permanganate, or another suitable regeneration medium which can be dissolved by water to form a brine or regenerant solution 39. As will be discussed in detail below, at any given time, one of the tanks 22A and 22B is "online" and treating water, and the other tank is "offline" and is undergoing regeneration or is on standby.

Still referring to FIGS. 1-3 in particular, the valve assembly 50 includes a valve housing 52, a regeneration valve 54 housed in the valve housing 52, and a selector valve assembly 100, 102 housed in the valve housing 52. An injector 55 is mounted on top of the valve housing 52 for drawing the regenerant solution 39 through the offline resin tank 22A or 22B during a regeneration cycle. A timer/controller module 56 is mounted on one side of the valve housing 52, and a selector valve drive assembly 58 mounted on the other side of the valve housing 52. The selector valve drive assembly 58 is described in more detail below. The timer/control module 56 includes a timer and/or an electronic controller for energizing an electrically operated valve driver such as a reversible dc electric motor (not shown). The valve driver actuates the regeneration valve 54. In the illustrated embodiment in which the regeneration valve 54 is of the reciprocating piston type, the valve driver linearly translates a drive rod 60 (FIG. 10) that extends into the valve housing 52 to operate the regeneration valve 54.

Before discussing the physical construction of the preferred embodiment of the selector valve assembly and the regeneration valve, a conceptual discussion of the general construction and operation of those valves and of the relationship therebetween will be discussed in conjunction in FIG. 3.

The regeneration valve 54 is a servo-actuated valve that controls the regeneration of whichever tank is selected by the selector valve assembly as being offline. The regeneration valve 54 has first and second control ports 62 and 64, a regeneration port 66, a drain port 68, and a brine port 70. The first and second control ports 62 and 64 are coupled to the selector valve assembly via internal passages 72 and 74 in the valve housing 52 as will be described below. The regeneration port 66 is coupled to one of an untreated water inlet port 114 and a treated water outlet port 132 in the valve housing 52 by an internal passage 76 in the valve housing 52. The brine port 70 is coupled to a brine outlet 78 of the valve housing 52 by another internal passage 80. During a regeneration cycle, the regeneration valve 54 is driven by the motor of the control module 56 to couple the inlet and outlet of the offline resin tank to the control ports 62 and 64 of the regeneration valve 54. For example, the regeneration valve 54 may switch between service, brine introduction, backwash, and fast rinse positions, and back to the service position. The offline tank in communication with the regeneration valve 54 will be on stand-by when the regeneration valve 54 is in its service position.

Still referring to FIG. 3, the selector valve assembly includes first (inlet) and second (outlet) four way, two position valves 100, 102 each having first through fourth ports. The valves 100, 102 are actuated in concert with one another such as being driven by a common shaft 104 which is driven by the selector valve drive assembly 58 (FIG. 2). Each of the inlet and outlet valves 100, 102 will now be described in turn.

The first port 106 of the inlet valve 100 is an untreated water inlet port coupled to an untreated water inlet port 114 of the valve housing 52 by an internal passage 116 in the valve housing 52. The second and third ports 108, 110 of the inlet valve 100 are outlet ports coupled to the first and second tanks 22A and 22B by respective ports 118, 120 in the valve housing 52 and internal passages 122, 124 in the valve housing 52. The fourth port 112 of the inlet valve 100 is a control port coupled to the first control port 62 in the regeneration valve 54 by the passage 72. In a first position of the inlet valve 100 illustrated in FIG. 3, the first and second ports 106 and 108 are coupled to one another to couple the first tank 22A to the untreated water inlet 114 of the valve housing 52, and the third and fourth ports 110 and 112 are coupled to one another to couple the inlet of the second tank 22B to the regeneration valve 54. The first tank 22A is online and the second tank 22B is offline in this position of the inlet valve 100. The inlet valve 100 is switchable to a second position in which the first and third ports 106 and 110 are coupled to one another to couple the second tank 22B to the untreated water inlet 114 of the valve housing 52, and the second and fourth ports 108 and 112 are coupled to one another to couple the inlet of the first tank 22A to the regeneration valve 54. The second tank 22B is online and the first tank 22A is offline in this position of the inlet valve 100.

Still referring to FIG. 3, the first port 130 of the outlet valve 102 is a treated water outlet port coupled to a treated water outlet port 132 of the valve housing 52 by an internal passage 134 in the valve housing 52. The second and third ports 136 and 138 of the outlet valve 102 are inlet ports coupled to the outlet ports of the first and second tanks 22A and 22B by respective ports 140, 142 in the valve housing 52 and internal passages 144, 146 in the valve housing 52. The fourth port 150 of the outlet valve 102 is a control port coupled to the second control port 64 in the regeneration valve 54 by the passage 76.

In a first position of the outlet valve 102, illustrated in FIG. 3, the first and second ports 130 and 136 are coupled to one another to couple the outlet of the first tank 22A to the treated water outlet 132 of the valve housing 52, and the third and fourth ports 138 and 150 are coupled to one another to couple the outlet of the second tank 22B to the regeneration valve 54. The first tank 22A is online and the second tank 22B is offline in this position of the outlet valve 102. The outlet valve 102 is switchable to a second position in which the first and third ports 130 and 138 are coupled to one another to couple the second tank 22B to the treated water outlet 132 of the valve housing 52, and the second and fourth ports 136 and 150 are coupled to one another to couple the outlet of the first tank 22A to the regeneration valve 54. The second tank 22B is online and first tank 22A is offline in this position of the outlet valve.

The physical construction of a preferred embodiment of a valve assembly 50 having the functionality described above will now be described with reference to FIGS. 2 and 4-10.

Figure 4:
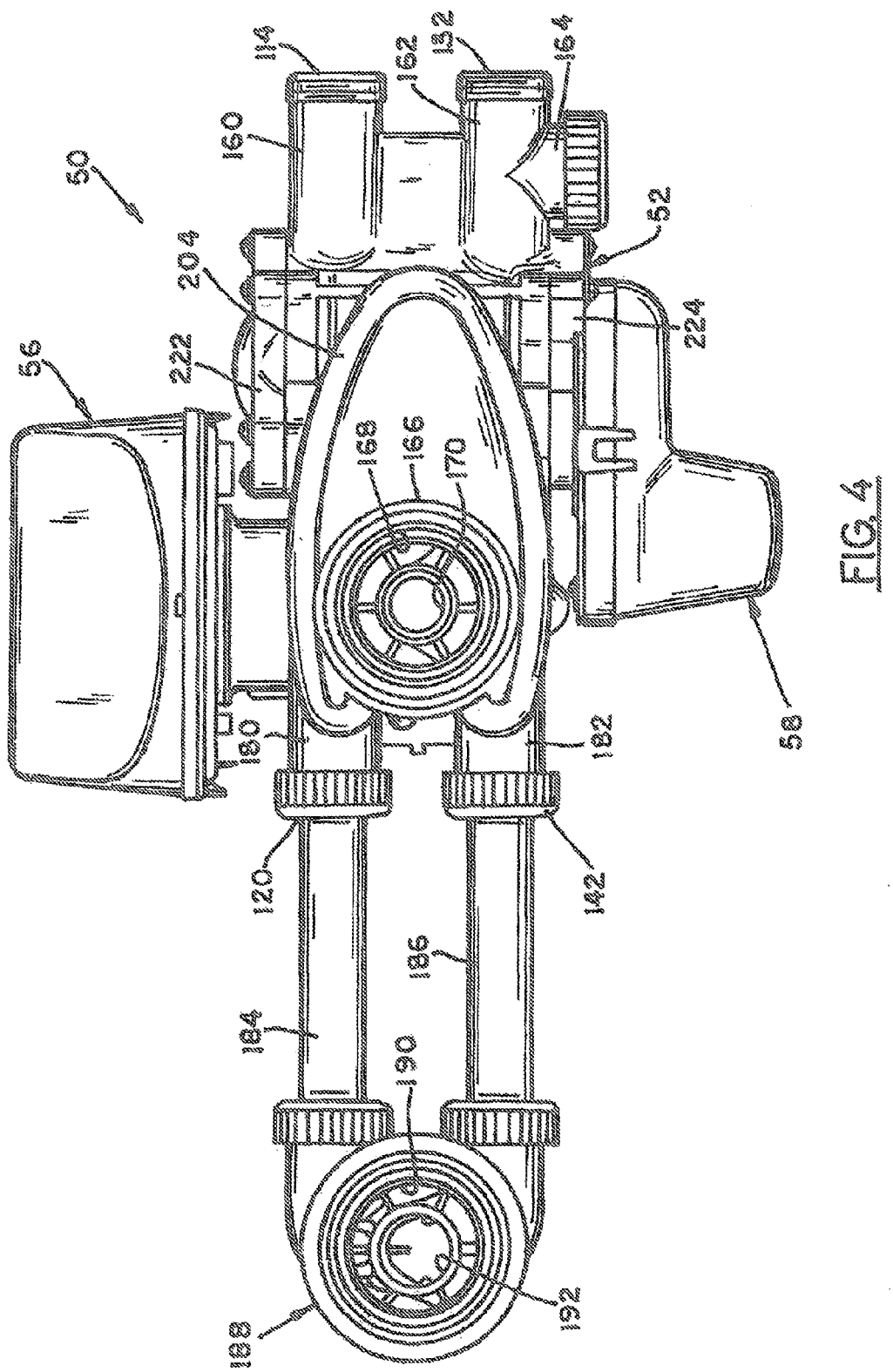
FIG. 4 is a bottom plan view of the valve assembly of FIG. 2.
Figure 5:
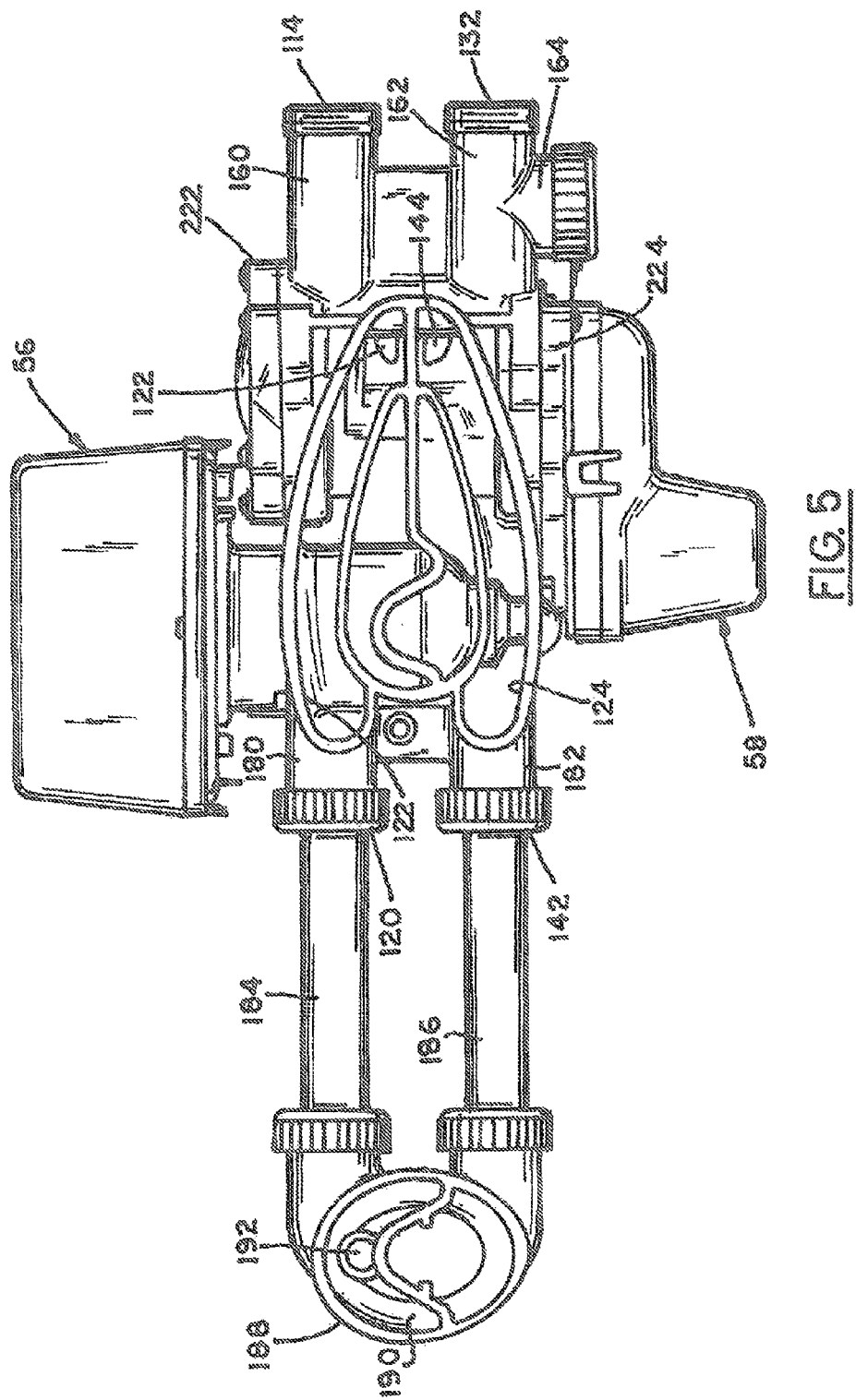
FIG. 5 is a bottom plan view of the valve assembly with the bottom cover removed.
Figure 6:
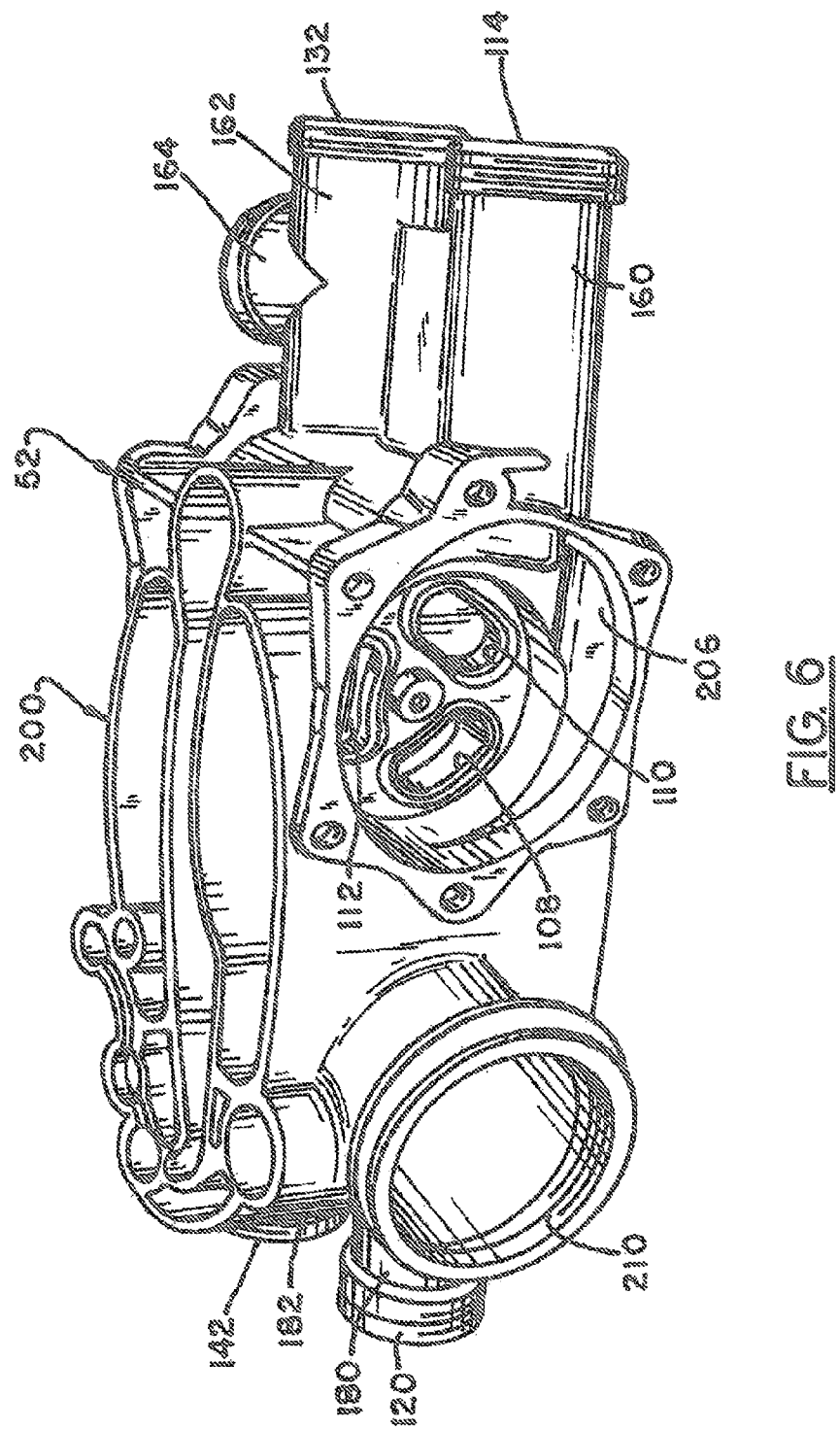
FIG. 6 is a perspective view of a valve body of the valve assembly.
Figure 7:
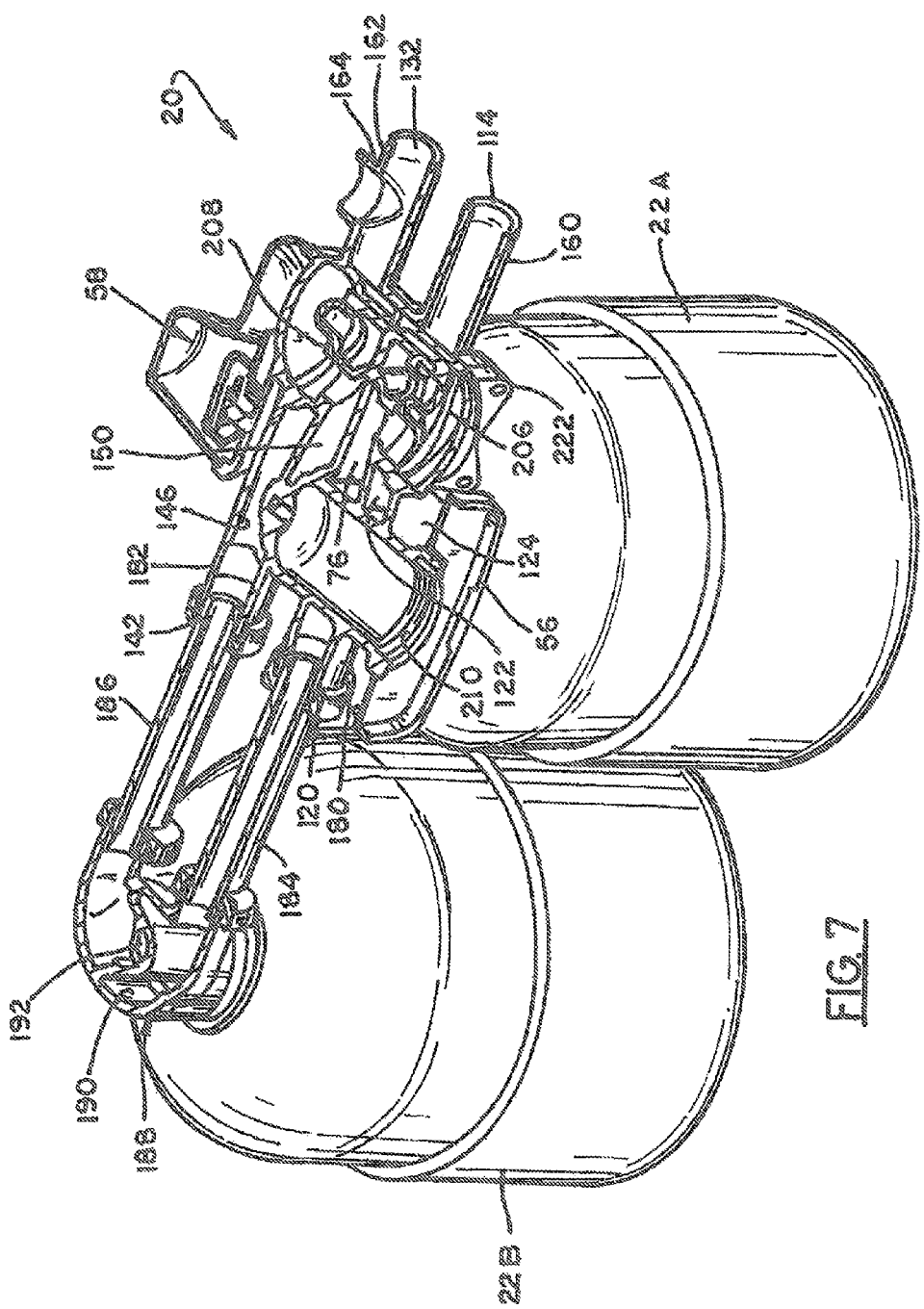
FIG. 7 is a sectional top plan view of the valve body of FIG. 6, taken though the upper portion of the valve body.

Referring initially FIG. 2, the valve assembly 50 is conceptually divided into inlet and outlet sides thereof because the untreated water inlet 114 and the inlet valve 100 are located on one side of the valve assembly 50 and the treated water outlet 132 and the outlet valve 102 are located on the other side of the valve assembly 50. All components of the valve are mounted on or in the valve housing 52 or are formed integrally with it. The valve housing 52 also is conceptually divided into inlet and outlet sides. It has the above-described untreated water inlet port 114 and the treated water outlet port 132 located at the end of respective inlet and discharge tubes 160 and 162 extending from the front end of the valve housing 52. A branch 164 extends off the discharge tube 162 for receiving a flow meter (not shown). The valve housing 52 is mounted on the first tank 22A by a threaded connector 166 molded integrally with the valve housing 52 as best seen in FIG. 4. The connector 166 has an annular bore 168 surrounding a cylindrical bore 170. The bores 168 and 170 terminate in the first set of outlet and inlet ports 118 and 140 opening into inlet and outlet ports of the first tank 22A, respectively. The second set of outlet and inlet ports 120 and 142 in the valve housing 52 are formed on the ends of tubes 180 and 182 extending from the rear end of the valve housing 52 and open into respective connector tubes 184, 186 that couple those ports to a fitting 188 mounted on top of the second resin tank 22B. The fitting 188 has an annular bore 190 surrounding a cylindrical bore 192. The bores 190 and 192 open into the inlet and outlet ports of the second tank 22B, respectively, as best seen in FIGS. 4 and 5.

Referring now to FIGS. 4-10, the valve housing 52 has a valve body 200 covered by a number of plates. The valve body 200 comprises an injection molded plastic element having several of the above-described fittings and other components mounted thereon or molded therein. Also molded within the valve body 200 are several external ports opening into the exterior of the valve body 200, several interior ports opening into the bores, and several passages connecting the internal ports to the external ports, all of which correspond to various ones of the passages and ports described above in conjunction with FIG. 3. Top and bottom cover plates 202 and 204 are heat bonded or otherwise mounted on the top and bottom surfaces of valve body 200 to seal the various internal passages in the valve body 200 from one another.

Figure 8:
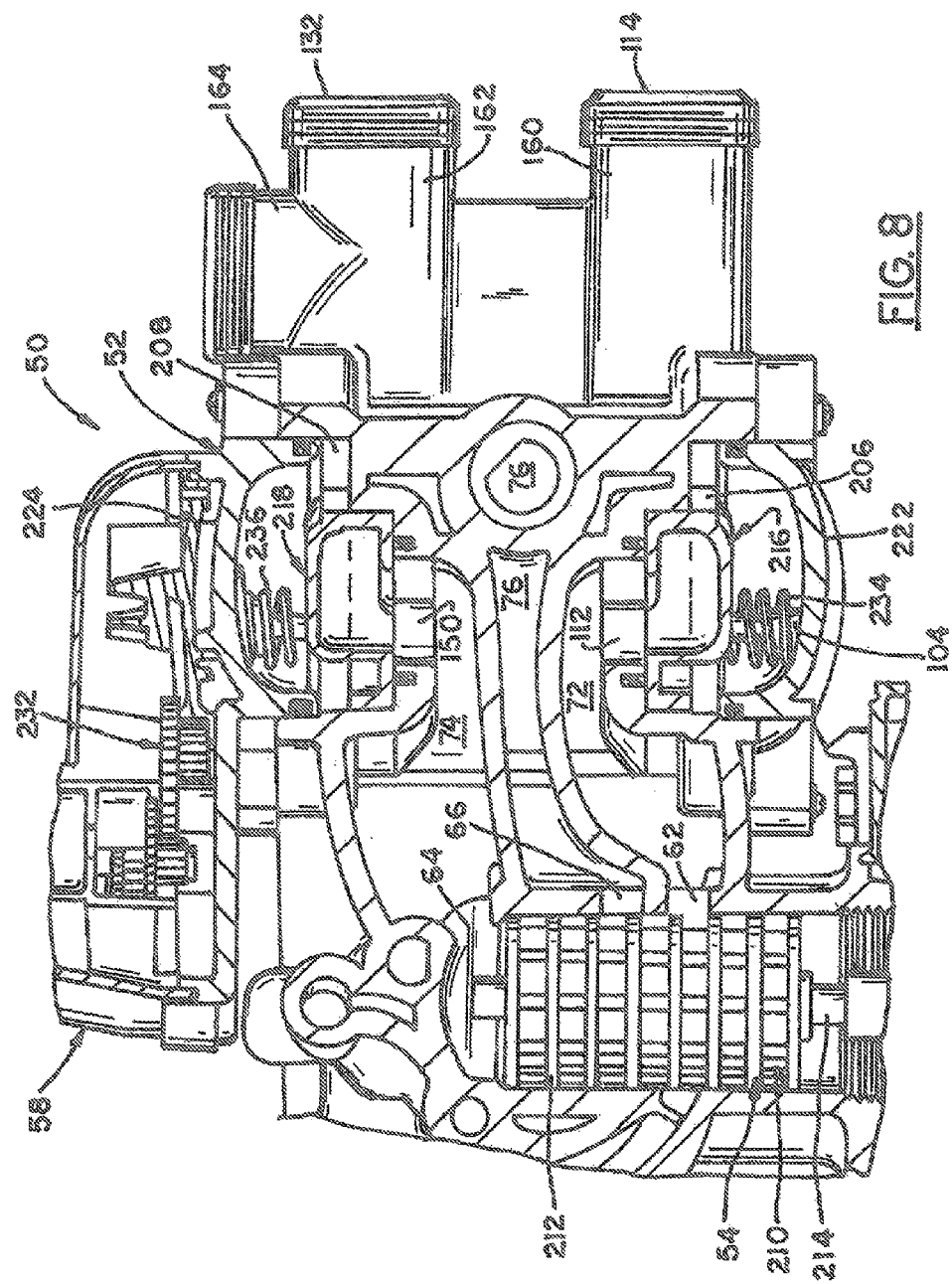
FIG. 8 is a partially cut-away, top plan view of a front portion of the valve assembly.
Figure 9:
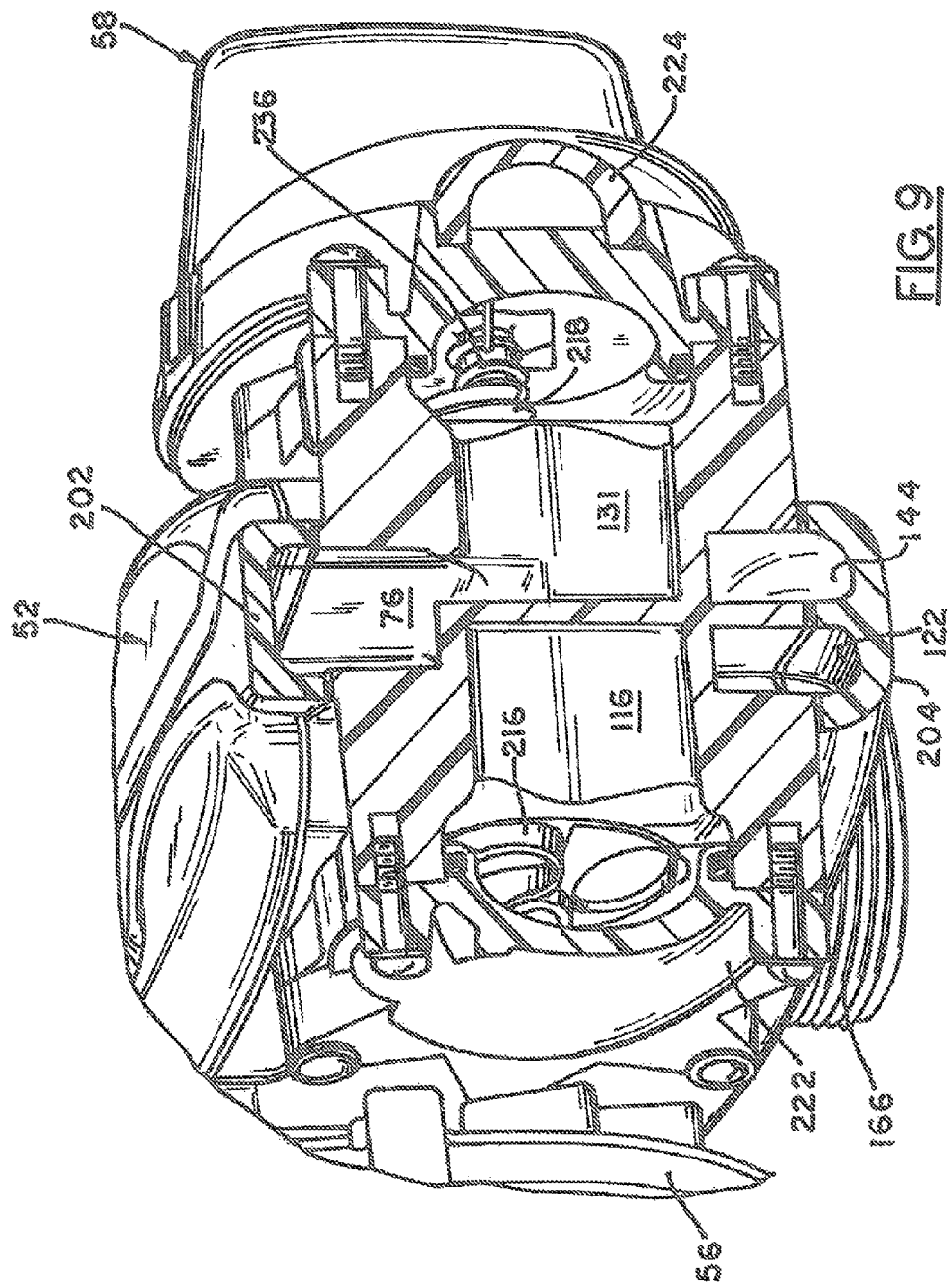
FIG. 9 is a sectional end view of the valve assembly, taken through a front end portion of the valve assembly.
Figure 10:
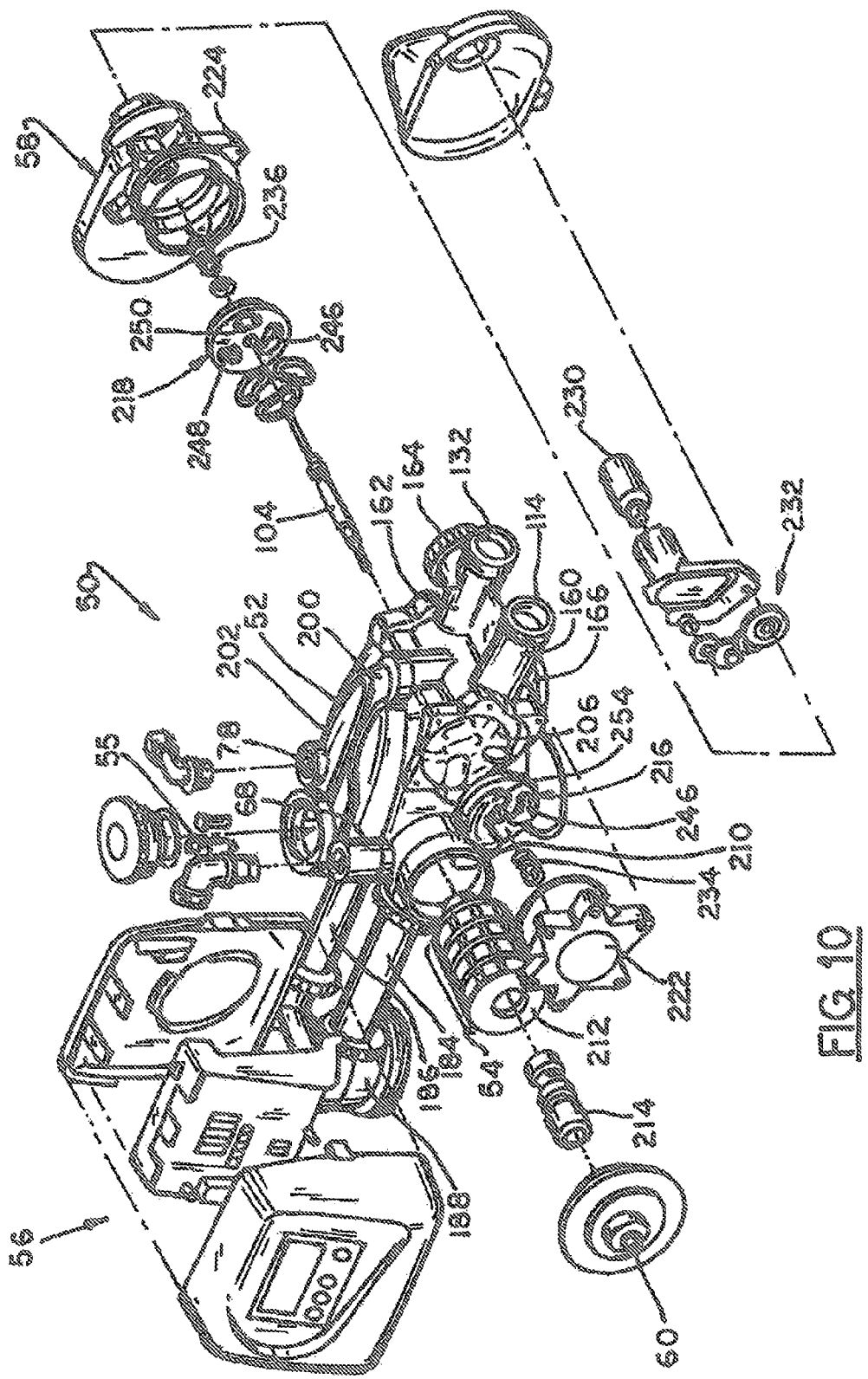
FIG. 10 is an exploded perspective view of the valve assembly.

Still referring to FIGS. 4-10 and FIGS. 6-8 in particular, the inlet and outlet valves 100 and 102 are rotary inlet and outlet valves mounted in chambers 206 and 208 on the respective inlet and outlet sides of the valve housing 52. The regeneration valve 54 is mounted in a bore 210 formed in the inlet side of the valve body 200 behind the inlet valve chamber 206. The regeneration valve 54 of this embodiment is of the so-called reciprocating piston-type valve, specifically of the type disclosed in U.S. Pat. No. 6,402,944, which, as discussed above, is incorporated by reference. Referring to FIGS. 8 and 10, the regeneration valve 54 includes a seal stack 212 housed in the bore 210 and a reciprocating piston 214 that is movable axially in the seal stack 212 under the operation of the controller 56 to selectively couple and decouple various ports within the bore 210 to one another. The first and second control ports 62 and 64 and regeneration port 66 all are formed in the periphery of the bore as seen in FIG. 8 and open into the respective internal passages 72, 74, and 76 in the valve housing 52. The brine port and drain port also open into bore 210 in a manner not shown in the drawings. The regenerating passage 76 is connected to the treated water outlet port 132 as seen in part in FIG. 8. The regenerating passage 76 could alternatively open into the untreated water inlet port 114 or, in a particularly sophisticated embodiment, into a selector valve capable of selecting between the two ports. It would be desirable to regenerate with untreated water as opposed to treated water if, for instance, the system is sized such that there is insufficient water available in the online tank to provide both service flow and regenerating flow simultaneously, in which case it would be preferred to regenerate with raw or untreated water so as to assure adequate flow of treated water.

Referring now to FIGS. 8-10, the rotary inlet and outlet valves 100 and 102 are mounted in respective chambers 206 and 208 on the respective inlet and outlet sides of the valve housing 52. The movable elements of the valves 100 and 102 of the illustrated embodiment comprise disks 216 and 218. The disks 216 and 218 are controlled to move in concert with one another. In the present example, they are mounted on a common shaft 104 that extends laterally through the valve housing 52 from the inlet side to the outlet side thereof. The shaft 104 is borne in an endcap 222 covering the inlet chamber 206, extends through the inlet disk 216 and the inlet chamber 206, through the center of the valve body 200, through the outlet chamber 208 and the outlet disk 218, through an end cap 224 disposed on the outlet side of the valve housing 52, and into the selector drive assembly 58. The selector drive assembly 58 includes a reversible DC electric motor 230 coupled to the shaft 104 by a gear train 232. Each of the disks 216 and 218 is mounted on the shaft 104 so as to rotate with it but so as to be slidable axially of it. Each disk 216 and 218 is held against the inner wall of the associated chamber 206 and 208 by a spring 234 and 236 positioned between the outboard face of the associated disk 216 or 218 and the associated endcap 222 or 224.

It should be noted at this time that this configuration provides a remarkably simple and easy-to-assemble selector valve assembly 50. The valves 100 and 102 and associated components can be accessed for disassembly or replacement simply by removing one or both of the endcaps 222 and 224, which only requires removing a few threaded bolts.

Figure 11:
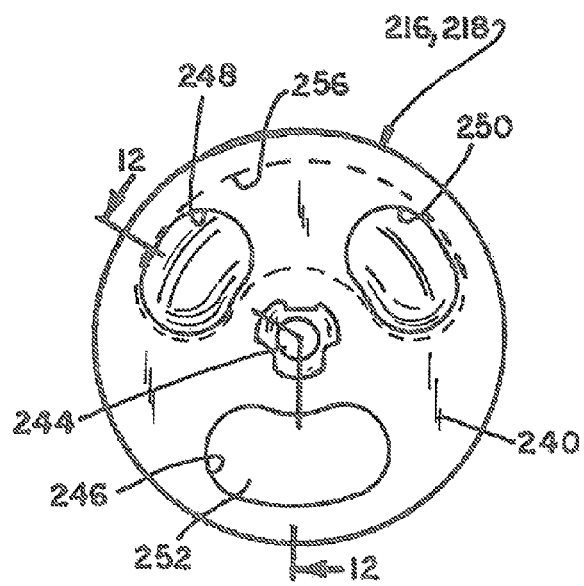
FIG. 11 is an inboard axial end view of one of the disks of the valve assembly.
Figure 12:
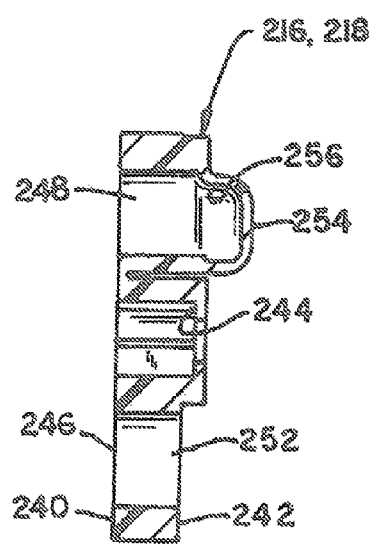
FIG. 12 is a sectional view of the disk of FIG. 11, taken generally along the lines 12-12 in FIG. 11.
Figure 13:
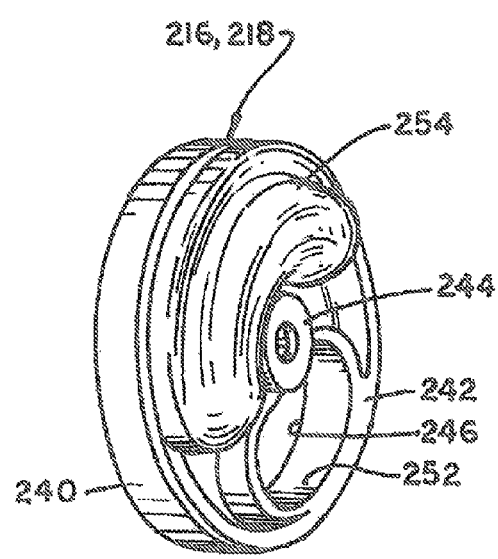
FIG. 13 is an isometric view of the disk of FIGS. 11 and 12.

The inlet and outlet valves 100 and 102 are identical and arranged face-to-face, allowing for mirror-image operation and permitting identical components to be used for each valve 100, 102. Referring to FIGS. 11-13, each disk 216, 218 comprises an injection molded plastic disk having inboard and outboard axial faces 240 and 242 and a central non-circular hub 244 for mounting the disk on a complimentary shaped portion of the shaft 104. The inboard axial face 240 of each disk has three circumferentially-spaced ports 246, 248, 250 that are spaced approximately 120° apart from each other. The first port 246 opens into a through bore 252 that extends axially through the body of the disk to the outboard face 242 thereof. The second and third ports 248 and 250 also extend through the body of the disk but terminate in an external lobe 254 on the outboard surface thereof that forms an enclosed channel 256 coupling the second and third ports 248 and 250 to one another.

Figure 14:
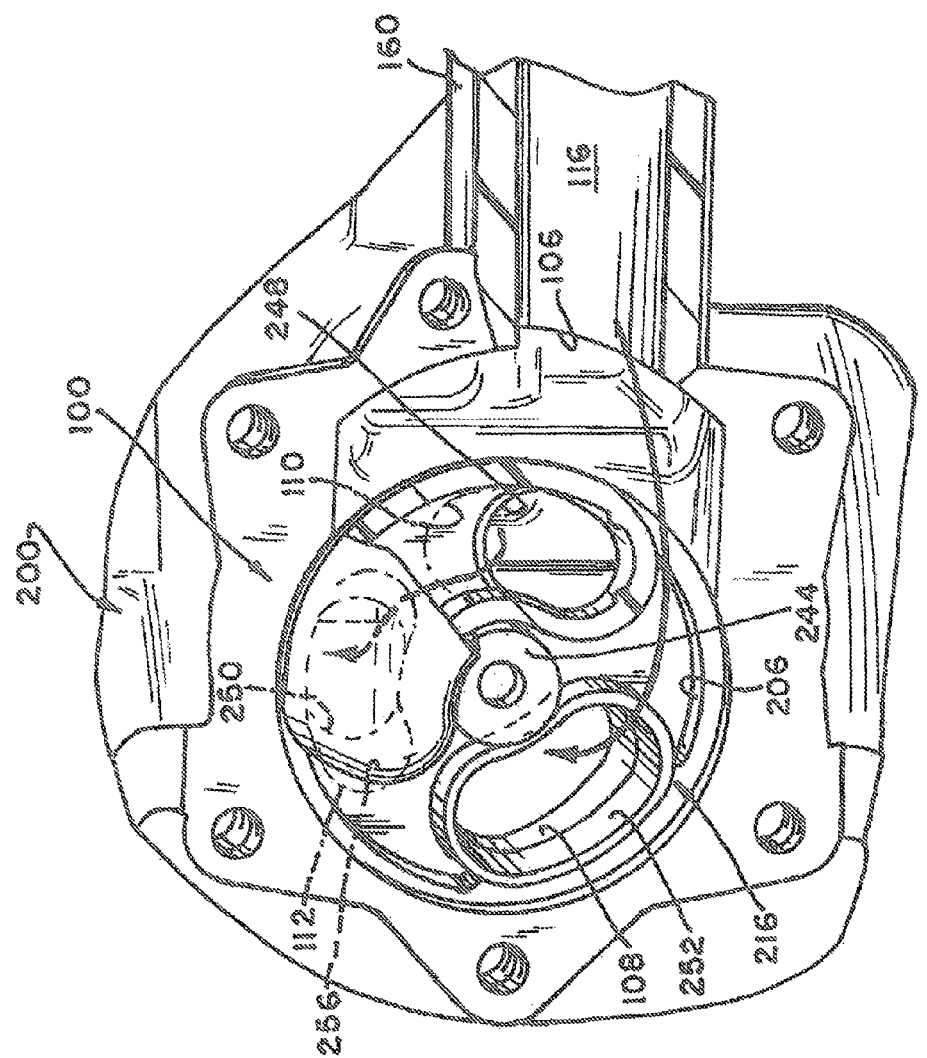
FIG. 14 is partially cut away fragmentary view of a front portion of an inlet side of the valve assembly, showing an inlet valve of the valve assembly in a first position thereof.
Figure 15:
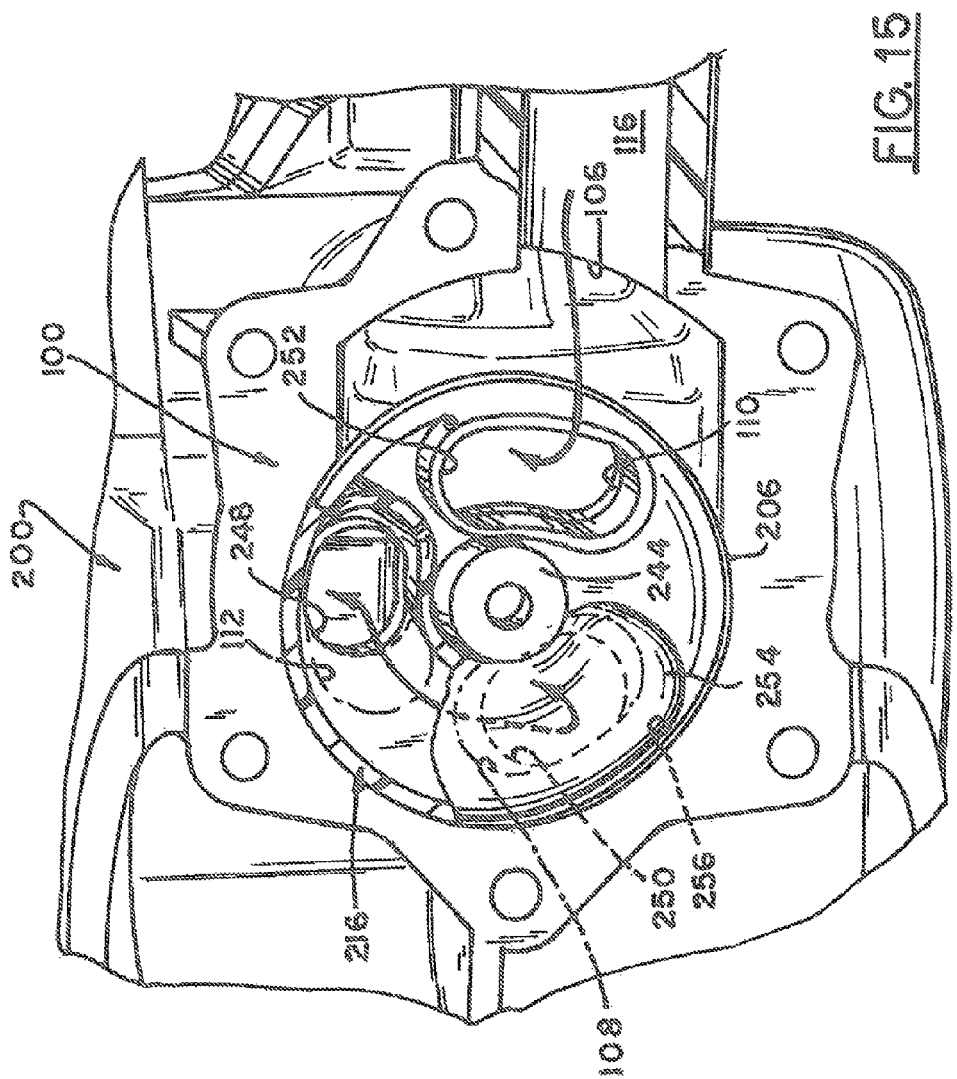
FIG. 15 corresponds to FIG. 14 but shows the inlet valve in a second position thereof.

Referring to FIGS. 14 and 15, the inlet chamber 206 has four ports 106, 108, 110, and 112 corresponding to the first through fourth ports in the inlet valve described above in connection with FIG. 3. The first port 106 is a radial port formed in a front peripheral surface of the chamber 206. It is coupled to the internal passage 116 opening into the untreated water inlet port 114 of the valve housing 52. The second, third, and fourth ports 108, 110, and 112 are axial ports formed in the inboard wall of the inlet chamber 206. The second and third ports 108 and 110 are outlet ports connected to the first and second outlet ports 118 and 120 of the valve housing 52 associated with the first and second tanks 22A, 22B, respectively, by the internal passages 122 and 124. The fourth port 112 is the control port and is connected to the first control port 62 on the regeneration valve 54 by the internal passage 72.

Figure 16:
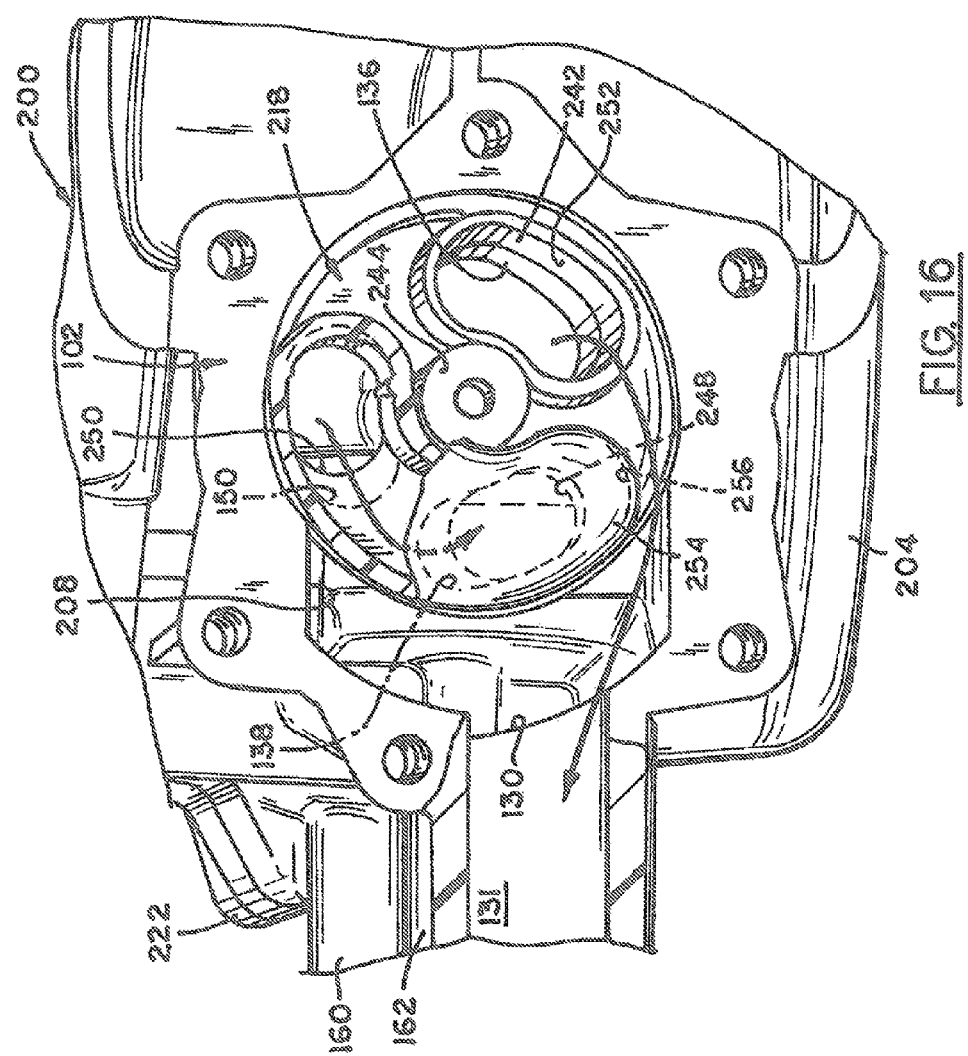
FIG. 16 is partially cut away fragmentary view of a front portion of an outlet side of the valve assembly, showing an outlet valve of the valve assembly in a first position thereof.

Similarly, referring to FIGS. 16 and 17, the outlet chamber 208 has four ports 130, 136, 138, and 150 corresponding to the first through fourth ports in the outlet valve 102 described above in connection with FIG. 3. The first port 130 is a radial port formed in a front peripheral surface of the outlet chamber 208 and is coupled to an internal passage 131 in the tube 162 opening into the treated water outlet port 132 of the valve housing 52. The second, third, and fourth ports 136, 138, and 150 are axial ports formed in the inboard wall of the outlet chamber 208. The second and third ports 136 and 138 are inlet ports connected to the first and second inlet ports 140 and 142 of the valve housing 52 associated with the first and second tanks 22A, 22B, respectively, by internal passages. The fourth port 150 is the control port and is connected to the second control port 64 of the regeneration valve 54 by internal passage 74.

The inlet disk 216 is movable between first and second positions illustrated in FIGS. 14 and 15, respectively. In the first position of FIG. 14, the first port 246 and through bore 252 in the inlet disk 216 is aligned with the first outlet port 108 associated with the first tank 22A. The second and third ports 248 and 250 in the inlet disk 216 are aligned with the third and forth ports 110 and 112 in the inlet chamber 206. With the inlet valve 100 in this position, untreated water is free to flow into the inlet chamber 206 through the inlet port 106, through the through bore 252 in the disk 216, through the outlet port 108 for the first tank, out of the first outlet 118 of the valve housing 52, and to the first tank 22A. The second outlet port 110 leading to the second tank 22B is isolated from the untreated water inlet port 106 at this time and, instead, is coupled to the regeneration valve 54 via the channel 256 and the third port 250 in the disk 216, the fourth port 112 in the inlet chamber 206, and the internal passage 74 in the valve housing 52 leading to the second control port 64 in the regeneration valve 54.

At the same time, the outlet valve 102 assumes the position illustrated in FIG. 16 in which the first, through bore 252 in the outlet disk 218 is aligned with the first inlet port 136 in the outlet chamber 208 and thus is exposed to the treated water outlet port 132 of the valve housing 52 via the radial outlet 130 in the outlet chamber 208. The third and forth ports in the outlet chamber 138 and 150, corresponding to the second inlet port in the outlet valve 102 and the second control port leading to the regeneration valve 54, respectively, are coupled to one another at this time via the second and third ports 248 and 250 on the inner face of the outlet disk 218 and the channel 256 in the outer face of the outlet disk 218. As a result, treated water flows out of the first tank 22A, through the outlet valve 102, and out of the treated water outlet 132 of the valve assembly. The second tank 22B is offline.

Assuming now that the system is controlled to place the second tank 22B online, the motor 230 is energized to drive the shaft 104 counterclockwise about 120° to rotate the inlet disk 216 from the "Tank A" position illustrated in FIG. 14 to the "Tank B" position illustrated in FIG. 15. With the inlet disk 216 in that position, the first, through bore 252 in the inner disk 216 is now aligned with the second outlet port 110 in the inlet chamber, permitting water to flow into that port through the disk 216 from the untreated water inlet 114, out of the port 110, through the internal passages in the valve housing 52, and out of the second outlet 120 of the valve housing 52 to the second tank 22B. The first outlet port 108 leading to the first tank 22A is coupled to the first control port 62 of regeneration valve 54 at this time via the third port 250 in the inlet disk 216, the internal passage 256 in the inlet disk 216, the second port 248 in the inlet disk 216, the fourth port 112 in the inlet chamber 206, and the first control passage 72 leading to the first control port 62 in the regeneration valve 54.

The "Tank B" position of the outlet valve 102 is illustrated in FIG. 17. The aforementioned 120° clockwise rotation of the shaft 104 moves the disk 218 to a position in which the first, through bore 252 in the disk 218 is aligned with the second inlet port 138 in the outlet chamber 208. Treated water is thus free to flow from the second tank 22B, through the second inlet port 138, axially through the through-bore 252 in the disk 218, out of the radial outlet 130 in the outlet chamber 208, and out of the treated water outlet 132 of the valve housing 52. At the same time, the outlet of the first tank 22A is coupled to the first control port 62 of the regeneration valve 54 via the first inlet port 136 in the outlet valve 102, the internal passage 256 in the disk 218, the control port 150, and the second control passage 74 leading to the second control port 64.

To again select tank A to place tank A online, the motor 230 is reversed to drive the disks 216 and 218 counterclockwise 120° as seen in the drawings to place the inlet and outlet disks 216 and 218 back to the positions illustrated in FIGS. 14 and 16, respectively.

Using properly-sized gearing in a readily-available reversible dc electric motor, the selector valve assembly 100, 102 can be driven from its "Tank A" position of FIGS. 14 and 15 to its "Tank B" position of FIGS. 16 and 17 in less than a minute, less than 30 seconds, and even on the order of 10-15 seconds. This is an order of magnitude faster than the prior art Pentair valve can be operated, resulting in much smoother changeover between tanks. The electric motor 230 preferably is controlled by the controller contained within the module 56 to coordinate operation of the selector valve assembly 100, 102 with operation of the regeneration valve 54.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A valve assembly for a water treatment system, the valve assembly comprising:
   (A) an untreated water inlet;
   (B) a treated water outlet;
   (C) a first outlet port coupled to an inlet of a first resin tank;
   (D) a second outlet port coupled to an inlet of a second resin tank;
   (E) a first inlet port coupled to an outlet of the first resin tank;
   (F) a second inlet port coupled to an outlet of the second resin tank;
   (G) a regeneration valve connected to a brine tank and to a drain; and
   (H) a tank selector valve assembly including
      (1) first and second rotary selector valves, and
      (2) a reversible electric motor that drives the first and second selector valves in concert between
         (a) a first position in which the first outlet port is coupled to the untreated water inlet, the first inlet port is coupled to the treated water outlet, and the inlet and outlet of the second resin tank are connected to the regeneration valve, and
         (b) a second position which the second outlet port is coupled to the untreated water inlet, the second inlet port is coupled to the treated water outlet, and the inlet and outlet of the first resin tank are connected to the regeneration valve.

2. The valve assembly as recited in claim 1, wherein the first and second selector valves comprise disks that are driven to rotate together.

3. The valve assembly as recited in claim 2, wherein the first and second selector valves are mounted on common shaft that is driven by the electric motor.

4. The valve assembly as recited in claim 1, wherein the first selector valve is an inlet valve located in an inlet chamber of a valve housing, the inlet chamber having first, second, third, and fourth ports coupled to the untreated water inlet, the first outlet port, the second outlet port, and the regeneration valve, respectively.

5. The valve assembly as recited in claim 4, wherein the inlet valve includes a disk having a first, through-bore and second and third bores that are coupled to one another by a channel and that are isolated from the first bore, wherein
when the inlet valve is in the first position thereof, 1) the through bore in the disk is coupled to the first and second ports in the inlet chamber and 2) the second and third ports in the disk are coupled to the third and fourth ports in the inlet chamber, respectively, and wherein
when the inlet valve is in the second position thereof, 1) the through bore is coupled to first and third ports in the inlet chamber and 2) the second and third ports in the disk are coupled to the second and fourth ports in the inlet chamber, respectively.

6. The valve assembly as recited in claim 1, wherein the second selector valve is an outlet valve located in an outlet chamber of a valve housing, the outlet chamber having first, second, third, and fourth ports coupled to the treated water outlet, the first inlet port, the second inlet port, and to the regeneration valve, respectively.

7. The valve assembly as recited in claim 6, wherein the outlet valve includes a disk having a first, through-bore and having second and third bores that are coupled to one another by a channel and that are isolated from the first bore, wherein
when the outlet valve is in the first position thereof, 1) the through bore in the disk is coupled to the first and second ports in the outlet chamber and 2) the second and third ports in the disk are coupled to the third and fourth ports in the outlet chamber, respectively, and wherein
when the outlet valve is in the second position thereof, 1) the through bore in the disk is coupled to first and third ports in the outlet chamber and 2) the second and third ports in the disk are coupled to the second and fourth ports in the outlet chamber, respectively.

8. The valve assembly as recited in claim 1, wherein the regeneration valve is slidable axially in a chamber having first, second, third, fourth, and fifth ports connected to the first selector valve, the second selector valve, a brine tank, a drain, and to one of the untreated water inlet port and the treated water outlet port, respectively.

9. A water treatment system, comprising:
(A) first and second resin tanks, each of which has an inlet and an outlet;
(B) a brine tank;
(C) a valve assembly comprising:
 (1) an untreated water inlet;
 (2) a treated water outlet;
 (3) a first outlet port coupled to the inlet of the first tank;
 (4) a second outlet port coupled to the inlet of the second tank;
 (5) a first inlet port coupled to the outlet of the first tank;
 (6) a second inlet port coupled to the outlet of the second tank;
(G) a regeneration valve coupled to the brine tank and to a drain;
(H) a tank selector valve assembly including a reversible electric motor and first and second rotary disks mounted on a common driven shaft and movable in concert under power of the motor between
 (1) a first position in which the first outlet port is coupled to the untreated water inlet, the first inlet port is coupled to the treated water outlet, and the second outlet port and the second inlet port are coupled to the regeneration valve, and
 (2) a second position which the second outlet port is coupled to the untreated water inlet, the second inlet port is coupled to the treated water outlet, and the first outlet port and the first inlet port are coupled to the regeneration valve.

10. A method of selecting between first and second resin tanks of a water treatment system, the method comprising:
(A) using a reversible electric motor, placing the first tank online by rotating first and second selector valves of a valve assembly clockwise
 (1) from a first position in which a) untreated water flows into the valve assembly from an untreated water inlet, through the first rotary selector valve, and into the second tank, b) treated water flows from the second tank, through the second rotary selector valve, and out of the valve assembly through a treated water outlet, and c) the first tank is coupled to a regeneration valve,
 (2) to a second position in which a) untreated water flows into the valve assembly from the untreated water inlet, through the first rotary selector valve, and into the first tank, b) treated water flows from the first tank, through the second rotary selector valve, and out of the valve assembly through the treated water outlet, and c) the second tank is coupled to the regeneration valve; and then
(B) using the reversible electric motor, placing the first tank offline and placing the second tank online by rotating the first and second rotary selector valves counterclockwise from the second position to the first position.

11. The method of claim 10, wherein the first and second rotary selector valves rotate through no more than 180° during each of steps (A) and (B).

12. The method of claim 11, wherein the first and second rotary selector valves rotate through no more than 150° during each of steps (A) and (B).

13. The method of claim 10, where each of steps (A) and (B) is performed in less than one minute.

14. The method of claim 10, where each of steps (A) and (B) is performed in less than 30 seconds.

15. The method as recited in claim 10, wherein the first rotary selector valve is an inlet valve located in an inlet chamber of a valve housing, the inlet chamber having first, second, third, and fourth ports coupled to the untreated water inlet, a first outlet port, a second outlet port, and the regeneration valve, respectively.

16. The valve assembly as recited in claim 15, wherein the first selector valve is a rotatable disk having a first, through-bore and having second and third bores that are coupled to one another by a channel and that are isolated from the first bore, wherein
when the disk is in the first position thereof, 1) the through bore in the disk is coupled to the first and second ports in the inlet chamber and 2) the second and third ports in the disk are coupled to the third and fourth ports in the inlet chamber, respectively, and wherein
when the disk is in the second position thereof, 1) the through bore in the disk is coupled to first and third ports in the inlet chamber and 2) the second and third ports in the disk are coupled to the second and fourth ports in the inlet chamber, respectively.

17. The method as recited in claim 10, wherein the second selector valve is an outlet valve located in an outlet chamber of a valve housing, the outlet chamber having first, second, third, and fourth ports coupled to the treated water outlet, a first inlet port, a second inlet port, and to the regeneration valve, respectively.

18. The valve assembly as recited in claim 17, wherein the second selector valve is a rotatable disk having a first, through-bore and having second and third bores that are coupled to one another by a channel and that are isolated from the first bore, wherein when the disk is in the first position thereof, 1) the through bore in the disk is coupled to the first and second ports in the outlet chamber and 2) the second and third ports in the disk are coupled to the third and fourth ports in the outlet chamber, respectively, and wherein when the disk is in the second position thereof, 1) the through bore in the disk is coupled to first and third ports in the outlet chamber and 2) the second and third ports in the disk are coupled to the second and fourth ports in the outlet chamber, respectively.

\* \* \* \* \*